April 7, 1953       E. A. PHANEUF       2,633,950

SPRING TYPE ONE-WAY DRIVE

Filed Sept. 21, 1949

Inventor:
Edgar A. Phaneuf,
by Russell A. Warner
His Attorney.

Patented Apr. 7, 1953

2,633,950

UNITED STATES PATENT OFFICE 2,633,950

SPRING TYPE ONE-WAY DRIVE

Edgar A. Phaneuf, Southborough, Mass., assignor to General Electric Company, a corporation of New York Application September 21, 1949, Serial No. 116,964

1 Claim. (Cl. 192—41)

This invention relates to electric clock motors and in particular to an improved starting device for assisting the starting effort of vibrating type polarized rotor alternator motor.

In small vibrating-start type motors, it is possible, when current is first applied, to start a motor in either direction. Frequently, however, apparatus driven by such a small motor functions properly only if the motor starts in a predetermined direction.

This invention has for its primary object the provision of an improved device that prevents a vibrating start type polarized rotor alternator motor from starting in the wrong direction.

It is a further object of this invention to provide an improved low cost detent which assists the starting effort of a vibrating start type motor.

It is a still further object of this invention to provide a simple and compact one-way drive detent for vibrating start type motors that occupies little space and involves no intricate functioning components.

Broadly, this invention comprises a piece of spring steel wound on two diameters to form a detent which permits the rotor of a motor to rotate freely only in one direction. The detent expands at the larger diameter to prevent the rotor of a motor from starting in the wrong direction and the expansion of the detent then gives a resilient impetus to the reversing of direction of the rotor of a motor to start it operating in the proper direction.

Further objects and advantages of this invention will become apparent and the invention will be better understood from the following description referring to the accompanying drawing and the features of novelty which characterize this invention will be pointed out with particularity in the claim annexed to and forming a part of this specification.

Figure 1:
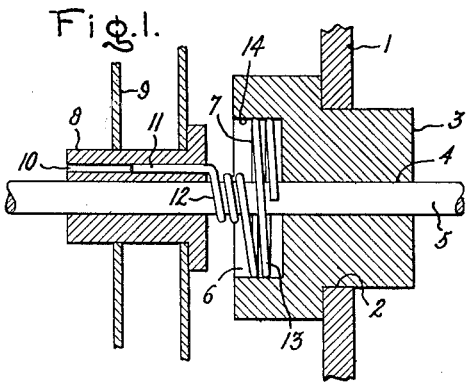
Figure 2:
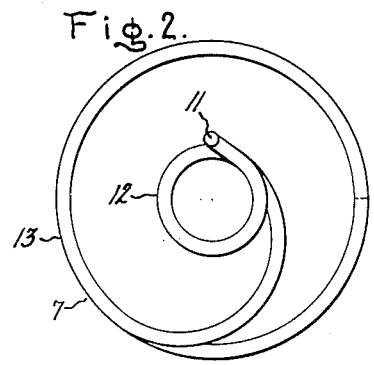
Figure 3:
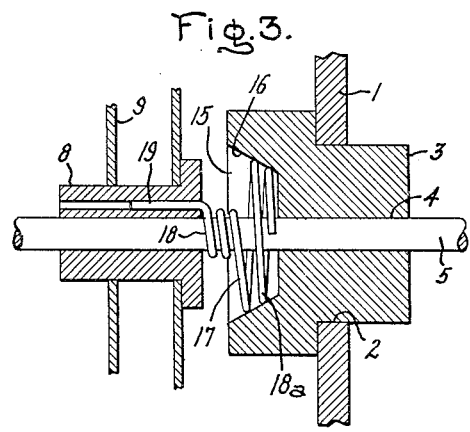
Figure 4:
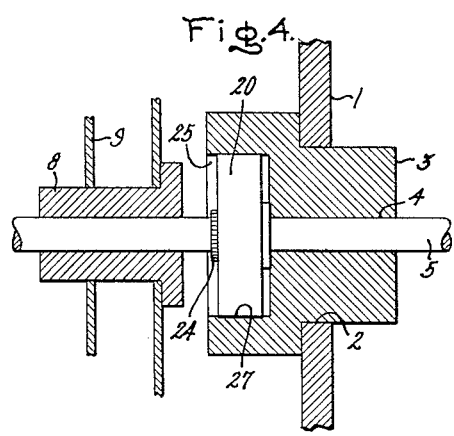
Figure 5:
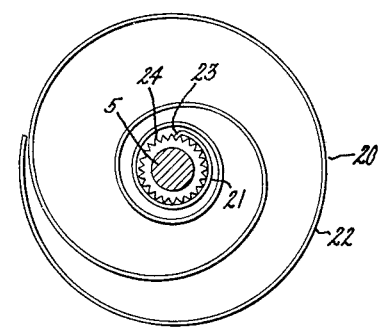

In the drawing, Fig. 1 is an elevation view, partly in section, showing the improved detent positioned between a motor housing and a bushing in a motor endshield; Fig. 2 is an end elevation view of a spring used in the one-way drive detent; Fig. 3 is a side elevation view, partly in section, of a modification of the one-way drive detent; Fig. 4 is a side elevation, partly in section, of still another modification of the one-way drive detent; while Fig. 5 is an end elevation view of the modifications of the one-way drive detent shown in Fig. 4.

Referring to the drawing, a motor end shield 1 is provided with an opening 2 for accommodating a stationary bushing 3. In bushing 3, an opening 4 is provided for a shaft 5 of a motor, while a second opening 6 is provided for a coil spring 7. A second bushing 8 is mounted on shaft 5 axially displaced from bushing 3. Rotor 9 of the motor is mounted on bushing 8. Rotor 9, bushing 8, and shaft 5 rotate as a unit.

Coil spring 7 is a single piece of wire wound on two diameters and having a portion 11 that extends axially from the smaller of the two diameters. Any convenient number of turns may be used in the small and the large windings that form spring 7. Smaller winding 12 is wound to closely fit shaft 5, while larger winding 13 is formed at a diameter that is slightly larger than the diameter of opening 6 in bushing 3.

For proper operation, spring 7 is placed on shaft 5 between bushings 3 and 8. Axially extending portion 11 of spring 7 is inserted into an opening 10 provided therefor in bushing 8.

As shown in Fig. 1, if rotor 9 turns in a clockwise direction (looking at it from endshield 1) the larger diameter 13 of spring 7 tends to wind up and freely rotates within opening 6 in bushing 3. On the other hand, however, if rotor 9 of the motor starts to turn in a counterclockwise direction (viewing the rotor from endshield 1), then spring 7 tends to unwind, causing larger winding 13 to expand and grip the inner surface 14 of opening 6, preventing further rotation of rotor 9 in a counterclockwise direction. The unwound spring, in being restored to its normal position, gives the rotor a resilient impetus in the clockwise direction at the next surge of power, causing the rotor to revolve continuously in a clockwise direction until power is shut off.

In a modification of this invention (shown in Fig. 3) bushing 3 in endshield 1 of the motor is provided with an opening 15 which has beveled sides 16. A spring 17 is provided with a small diameter winding 18 having an axial extension 19 that engages bushing 8 and a larger diameter winding 18a helically wound to match the slant of beveled edges 16 of opening 15 in bushing 3.

The operation of this modification is identical to the operation of the spring shown in Fig. 1. Specifically, if the rotor starts to turn in a clockwise direction (viewed from endshield 1) free movement is allowed. If the motor tends to start in a counterclockwise direction, however, spring 17 unwinds and outer diameter 18a frictionally grips wall 16 of opening 15, preventing rotation of the rotor shaft. It is understood that the axial spacing of the parts in maintained as represented. The unwound spring 17, in being restored to its normal position, resiliently gives an impetus to rotor 9, aiding rotation in the proper (clockwise) direction. In some applications, this modification is desirable, since it prevents distortion of detent springs. Specifically, a spring can be distorted if the rotor is turned by hand in the wrong (counterclockwise) direction. But if a proper bevel angle is used with a loosely wound matching spring, the friction can thus be predetermined to safely exceed the motor's maximum torque but to be less than the deformation strength of the spring. Thus, on mishandling, when the forces become great enough, the detent turns backward (counterclockwise from endshield 1) without harm and is again ready to function when motor torque only is to be controlled. It is to be noted that the spring 17 is loosely wound such that there is appreciable axial spacing between adjacent turns. Hence, when the outer periphery of the spring frictionally engages the wall 16 and the spring tends to unwind and expand in diameter, its convolutions can move closer together and accordingly to the left in Fig. 3, and hence, into a larger diameter portion of the cone-shaped recess 15. Such progressive expansion, unwinding and axial displacement of the outer convolutions of the spring are resisted by the increasing tendency of the spring to return to its initial smaller diameter loosely wound form. These opposing forces become equal and the spring slips before there is any permanent injurious deformation of such spring.

A still further modification of this invention is shown in Figs. 4 and 5. A spring 20 is spirally wound in a single plane to provide an inner coil 21 and an outer coil 22. Spring 20 does not directly connect bushings 3 and 8, however, as in the other modifications. Instead, shaft 5 is provided with a knurled surface 24 that engages a lip 23 on inner coil 21 of the spring. With this arrangement, if the rotor tends to turn in a counterclockwise direction, as viewed in Fig. 5, outer coil 22 freely rotates within opening 25 in bushing 3. On the other hand, however, if the rotor tends to rotate in a clockwise direction, as viewed in Fig. 5, then, through the engagement of knurled surface 24 on shaft 5 and bent portion 23 of spring 20, the spring tends to expand and outer coil 22 grips frictionally the inner surface 27 of opening 25 in bushing 3. This prevents further rotation in the clockwise direction, and spring 20, in being restored to its normal position, gives a resilient impetus to the rotation of the rotor in a counterclockwise direction at the next surge of power, and insures rotation in that direction.

Modifications of this invention will occur to those skilled in the art and it is desired to be understood, therefore, that this invention is not to be limited to the particular arrangement disclosed, but that the appended claim is meant to cover all modifications which are within the spirit and scope of this invention.

What I claim as new and desire to secure by Letters Patent of the United States is:

A one-way drive detent for small clock motors of the vibrating start type, comprising a unitary coil spring wound to provide a small diameter coil and a larger conically loosely wound helix in axially spaced relationship, a rotor having secured thereto a bushing with an opening therein, an axially directed extension on said smaller coil being in operative engagement with said opening in said bushing, a stationary bushing, said stationary bushing defining a circular recessed portion having beveled inner side walls for matching said conically wound helix to provide for free rotation of said rotor in a predetermined direction and for the unwinding and for the frictional engagement of said conically wound helix with said matching beveled walls of said recess in said stationary bushing to prevent rotation in the opposite direction when said rotor is driven by no greater than full motor torque and to slip when the applied torque is in excess of full motor torque, said rotor bushing and said stationary bushing being in spaced axial alignment with said spring and recess concentric with the axis of rotation of the rotor.

EDGAR A. PHANEUF.

REFERENCES CITED

The following references are of record in the file of this patent:

UNITED STATES PATENTS

| Number | Name | Date |
|---|---|---|
| 1,126,780 | Jones | Feb. 2, 1915 |
| 1,870,646 | Pitter | Aug. 9, 1932 |
| 2,101,665 | Arey et al. | Dec. 7, 1941 |

FOREIGN PATENTS

| Number | Country | Date |
|---|---|---|
| 168,195 | Germany | Aug. 4, 1904 |